Aug. 4, 1931.   P. S. BRALLIER ET AL   1,817,123
PROCESS FOR MAKING CARBON TETRACHLORIDE
Filed June 30, 1922
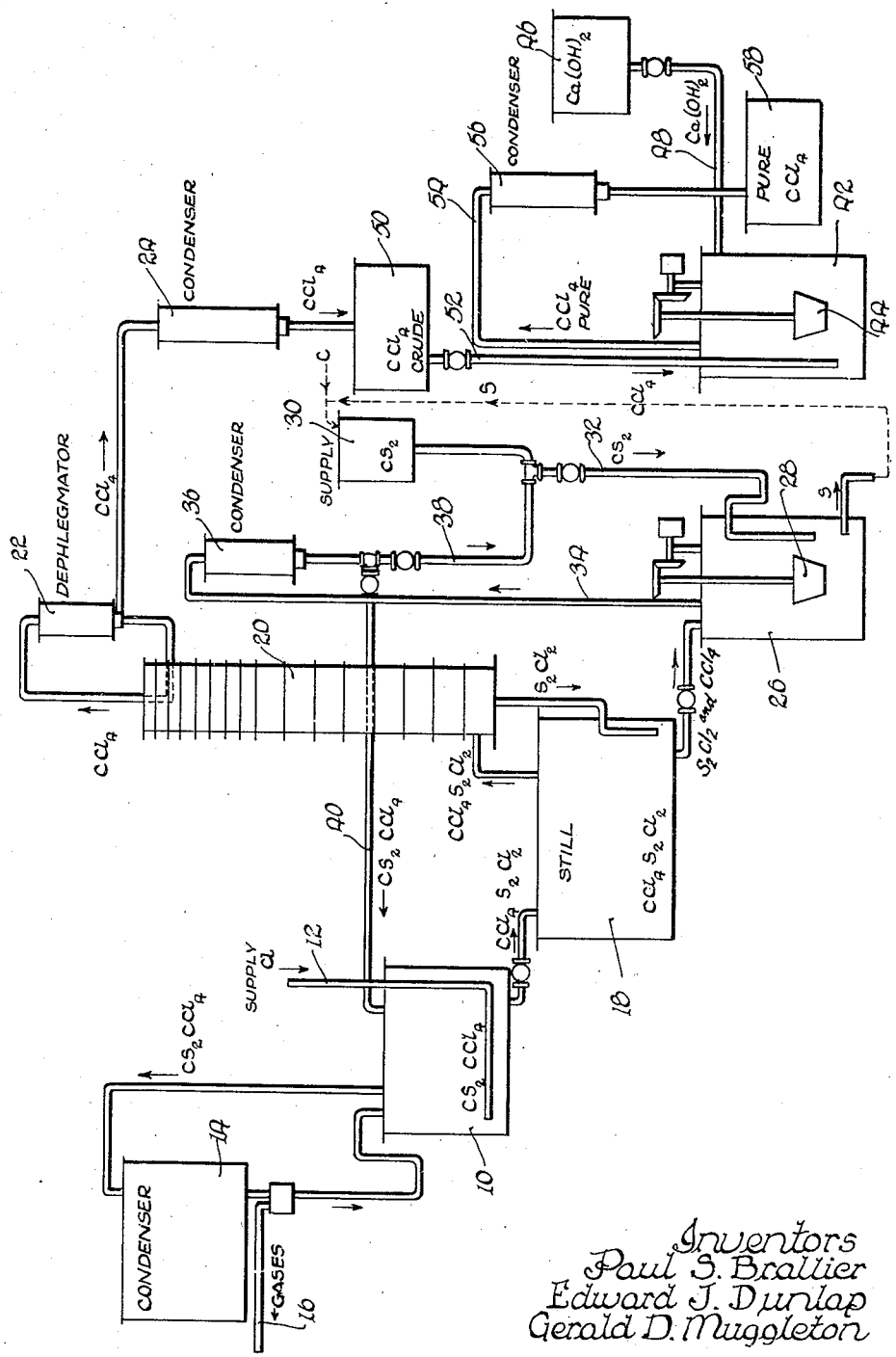
Inventors
Paul S. Brallier
Edward J. Dunlap
Gerald D. Muggleton
By Brown, Boettcher & Diener
Att'ys Patented Aug. 4, 1931                                     1,817,123

UNITED STATES PATENT OFFICE

PAUL S. BRALLIER, EDWARD J. DUNLAP AND GERALD D. MUGGLETON, OF NIAGARA FALLS, NEW YORK, ASSIGNORS TO NIAGARA SMELTING CORPORATION, OF NIAGARA FALLS, NEW YORK, A CORPORATION OF NEW YORK

PROCESS FOR MAKING CARBON TETRACHLORIDE

Application filed June 30, 1922. Serial No. 571,977.

This invention relates to the manufacture of carbon tetrachlorid, and has for its primary object to devise a simple, improved and economical process for such manufacture.

Another object is to improve the temperature control in certain steps of the process. More specifically, this object involves the automatic control of the temperature in certain portions of the apparatus employed to carry out the process.

Another object is to avoid the use or formation of sulfur dichlorid. This is one great step in the elimination of waste in separating and purifying the final product.

Another object is to separate the tetrachlorid by fractional distillation from a mixture of itself and another ingredient having a very different boiling point. More specifically, this object involves the separation of the tetrachlorid from a mixture of itself and sulfur monochlorid substantially free from carbon bisulfid and sulfur dichlorid.

Another object is by subdividing and segregating the reactions producing carbon tetrachlorid, to obtain as end products, sulfur free from other substances, especially sulfur monochlorid; and carbon tetrachlorid free from other substances, especially carbon bisulfid and sulfur monochlorid or dichlorid.

Another object is to carry on the formation of carbon tetrachlorid in two stages, one of which has a product from which the carbon tetrachlorid can be readily and effectively distilled, and the other of which can take the residue from the distillation and form new material to return to the first stage and an end product suitable for withdrawal in a useful and convenient form.

Further objects and advantages of the invention will become apparent as the description proceeds.

The accompanying drawing represents in a diagrammatic way one embodiment of apparatus for practicing the invention.

It is theoretically possible to make carbon tetrachlorid according to the following equation:

$$CS_2 + 3Cl_2 = CCl_4 + S_2Cl_2 \quad (1)$$

This is a practicable reaction, but by itself is undesirable because sulfur monochlorid is not a suitable end product. It is also limited by the serious objection to either carbon bisulfid or sulfur dichlorid in the product. The boiling points of these substances are:

| | |
|---|---|
| $CS_2$ | 46° C. |
| $CCl_4$ | 76.6° C. |
| $S_2Cl_2$ | 138° C. |
| $SCl_2$ | 59° C. |

It will be apparent that fairly pure carbon tetrachlorid can be distilled from a mixture of carbon tetrachlorid and sulfur monochlorid until nearly all the carbon tetrachlorid has been removed from the residue, but that the presence of carbon bisulfid would necessitate its removal first and give carbon tetrachlorid with two impurities instead of one.

Sulfur forms chlorin compounds containing higher proportions of chlorin than sulfur monochlorid, and reference is often made to a substance called sulfur dichlorid, having the formula $SCl_2$. Whether this substance is in fact a mixture of sulfur monochlorid and sulfur tetrachlorid or not, the further chlorination of sulfur monochlorid gives material referred to herein for convenience as sulfur dichlorid, having a boiling point so near that of carbon tetrachlorid that separation by fractional distillation is exceedingly difficult, and the resultant carbon tetrachlorid contains large amounts of three impurities instead of a small amount of one, which must all be eliminated by purification.

It will be apparent that it is essential to carry reaction (1) far enough to eliminate carbon bisulfid but not far enough to chlorinate the sulfur farther than the monochlorid.

The present invention involves the discovery that reaction (1), stage 1 of the process, can be carried out in the liquid phase by bubbling gaseous chlorin through a liquid mass comprising at first carbon bisulfid with or without some carbon tetrachlorid, in the presence of a suitable catalyst, such as iron. The reaction is exothermic and the boiling point of the mass rises as the reaction proceeds. It is also possible to control the reaction temperature automatically by the ebullition of the mass, which is placed in a chlorinator 10 and subjected to the action of chlorin through pipe 12. The vapors are condensed in a condenser 14, uncondensed gases passing off through pipe 16, and the condensate being returned to the chlorinator. Control of the reaction, therefore, involves nothing but control of the injection of chlorin, which may be fast or slow as desired, and the temperature is substantially as satisfactory an indication of the progress of the reaction as chemical analysis would be.

Chlorination of the mixture can safely continue to and a trifle beyond the point corresponding to the formula $S_2Cl_2$. The temperature is an exact indication, not of the heat developed but of the boiling point of the mixture because excessive heat is continually developed in the mass and any excess is automatically absorbed in condenser 14. In practice the temperature is observed and as soon as it ceases to rise the chlorin is turned off and the work is done correctly. It has been found that the sulfur chlorid in the still will sometimes be rich enough in chlorin to have a boiling point as low as 130 degrees C. instead of 138 degrees C., which corresponds to pure $S_2Cl_2$. This slight excess of chlorin can be added to the large mass of liquid in the bath without developing any of the difficulties incident to the presence of sulphur bichlorid, which boils at 59 degrees C.

The result of stage 1 is a mixture of carbon tetrachlorid and sulfur monochlorid free from both carbon bisulfid and sulfur dichlorid, from which an unusually pure grade of crude carbon tetrachlorid can be distilled. This is done in stage 2 in still 18, rectifying column 20, dephlegmator 22, and condenser 24. The resultant carbon tetrachlorid is not only free from carbon bisulfid and sulfur dichlorid but contains much less sulfur monochlorid than it would if the invention required the residue to be sulfur monochlorid, as will be apparent hereinafter.

The residue of stage 2 is sulfur monochlorid with a fair percentage of carbon tetrachlorid because the distillation was limited to temperatures giving carbon tetrachlorid almost free of sulfur monochlorid, and, therefore, did not remove all the carbon tetrachlorid. This substance as an end product would be an expense to get rid of if the process was carried out on a large scale, and, furthermore, the carbon tetrachlorid must not be thrown away and wasted.

According to the invention, this residue is subjected to the following reaction in stage 3:

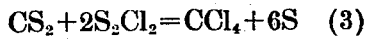
$$CS_2 + 2S_2Cl_2 = CCl_4 + 6S \quad (3)$$

The primary purpose of this stage is to eliminate sulfur monochlorid. Sulfur is a suitable end product, and carbon tetrachlorid the end product desired for the entire process, and as the boiling point of sulfur is about 445° C., these can be separated very readily. But sulfur monochlorid has a higher boiling point than carbon tetrachlorid or carbon bisulfid, and it is not possible to eliminate sulfur monochlorid by using a single formula equivalent of carbon bisulfid.

According to the present invention this apparent difficulty becomes advantageous rather than otherwise. The residue from stage 2 is run into a vessel 26, provided with an agitator 28, the agitator is started, and a slow stream of carbon bisulfid from source 30 is run through line 32 under the surface of the hot monochlorid. The heat of the reaction vaporizes part of the resulting carbon tetrachlorid-carbon bisulfid mixture, the vapors pass through line 34 to condenser 36, and the condensate is returned thru lines 38 and 32, while still more carbon bisulfid is being run in; so that a body of carbon tetrachlorid-carbon bisulfid mixture is built up in the still. When a small excess of carbon bisulfid has been added, the carbon bisulfid addition is stopped, and the still is steam heated, causing the mixture to boil; the vapors being led to the condenser and the condensate returned to the still as during the bisulfid addition. This reflux distillation is continued for a given period, to carry the reaction as far to the right as possible, after which the condensate is run into chlorinating vessel 10 through line 40.

When practically all of the carbon bisulfid-carbon tetrachlorid mixture has been driven out of the still, more carbon bisulfid is run in under the surface of the sulfur-sulfur chlorid mixture remaining, and the resulting vapors are condensed and returned to the still as in the first carbon bisulfid addition. When an amount of carbon bisulfid, approximately equal to that added in the first half of the operation has been run in, the volatile liquid is refluxed for a short time and then distilled over into chlorinator 10, leaving a residue of molten sulfur containing some sulfur monochlorid. This sulfur is drawn off.

The fourth stage is carried out in a lead-lined still, 42, provided with an agitator 44 and suitable heat control means (not shown). Milk of lime is first run into the still to a predetermined height from supply tank 46 through line 48; the agitator is started and crude carbon tetrachlorid is run in under the surface of the milk of lime from receiver 50 through line 52, the heat generated by the action of the lime on the sulfur chlorid being absorbed by cooling the still. When sufficient crude carbon tetrachlorid has been added, the agitator is stopped, still steam heated, and the purified carbon tetrachlorid distilled thru vapor line 54 to condenser 56, the condensate being caught in receiver 58.

The inter-relation of the various stages such that the objections to the process of any one stage become desirable in preparation for the next will be apparent. Because stage 1 stops at a point where carbon bisulfid is entirely eliminated and no sulfur dichlorid formed, stage 2 is a simple two-component separation with constituents of very different boiling points. Because the residue from stage 2 goes to stage 3 and the carbon tetrachlorid therein back to stage 1 to complete a closed cycle, stage 2 can be stopped at a point where the distillate is unusually pure. Because the distillate from stage 3 goes back to stage 1 and should contain a large proportion of carbon bisulfid it is possible to eliminate sulfur monochlorid from the residue of stage 3 by repeated reflux distillation with carbon bisulfid without accumulating a mass of undesirable material.

It should be noted that chlorin enters the system by line 12 and leaves in the finished product from receiver 58. Aside from a slight loss in the form of sulfur monochlorid in the residue from stage 3 and in the form of calcium chlorid from the purification chamber 42, there is no loss of chlorin. Carbon enters the system by supply 30 as carbon bisulfid and leaves it as carbon tetrachlorid in the finished product. Sulfur enters at supply 30 as carbon bisulfid and leaves as sulfur with the residue from stage 3. This does not represent consumption, however, as the sulfur from stage 3 is available for making more carbon bisulfid by any suitable or well known process. Aside from a slight loss in the form of sulfur monochlorid in the residue from stage 3 and in the crude carbon tetrachlorid, there is no consumption of sulphur.

In case the sulphur from stage 3 is used to make more carbon bisulfid for carrying out the above described process, the traces of sulfur monochlorid left in it will come back as impurities in the carbon bisulfid, either as carbon tetrachlorid or sulfur monochlorid or both. The step of making more carbon bisulfid from this sulfur, therefore, constitutes a part of the complete process involved in the invention, although per se it involves no novelty and may be carried out in any one of many well known ways. On this account, it has not been thought necessary to indicate in detail the old and well known apparatus employed for this step, the step being indicated diagrammatically by a dotted line carrying the sulfur from stage 3 to unite with carbon and enter supply 30 as carbon bisulfid.

In combination with the rest of the process, this step has the novel function of saving any traces of sulfur monochlorid in the sulfur from stage 3, which facilitates the process not only by saving waste at this point, but by making it unnecessary to carry the reaction of stage 3 as near completion as would be commercially advisable if the sulfur were to be used for other purposes.

The solubility of carbon bisulfid and sulfur dichlorid in carbon tetrachlorid, and the difficulty in separating compounds having boiling points so near the same temperatures has been heretofore one of the chief causes of waste and expense in the production of carbon tetrachlorid. This is entirely eliminated by the present invention because sulfur dichlorid is never formed and the carbon tetrachlorid is removed at a point where all the carbon bisulfid has been decomposed according to reaction 1.

Without further elaboration, the foregoing will so fully explain the gist of the invention, that others may, by applying current knowledge, readily adapt the same for use under various conditions of service, without eliminating certain features which may properly be said to constitute the essential items of novelty involved, which items are intended to be defined and protected by the following claims:

We claim:—

1. A process for making carbon tetrachlorid which comprises, forming carbon tetrachlorid and sulfur monochlorid by the inter-action of carbon bisulfid and chlorin, separating part of the carbon tetrachlorid from the sulfur monochlorid to form an end product, and forming more carbon tetrachlorid by the inter-action of carbon bisulfid with the sulfur monochlorid resulting from the preceding steps.

2. A process for making carbon tetrachlorid which comprises, chlorinating carbon bisulfid far enough to obtain a mixture of carbon tetrachlorid and sulfur monochlorid free from carbon bisulfid and sulfur dichlorid, subjecting the mixture to fractional distillation, removing the chlorin from the residue with an excess of carbon bisulfid, removing sulfur and then chlorinating the remaining carbon bisulfid.

3. The method of making carbon tetrachlorid which comprises, passing material containing initially and essentially carbon bisulphide in batches through a cycle comprising a first reaction chamber, a still, and a second reaction chamber, introducing chlorin into the first reaction chamber, withdrawing carbon tetrachlorid from the still only, and introducing carbon bisulfid and withdrawing sulfur from the second reaction chamber, the carbon tetrachlorid formed in the second reaction chamber going through the first reaction chamber on its way back to the still.

4. The method of making carbon tetrachlorid employing sulfur as a conveyor of the chlorin to the carbon, which comprises chlorinating the sulfur out of carbon bisulfid, taking the chlorin out of the resulting sulfur monochlorid by carbon bisulfid, and using the resulting carbon bisulfid mixed with carbon tetrachlorid for further chlorinating.

5. In a process for making carbon tetrachlorid, the step of reducing sulfur monochlorid to sulfur which consists in subjecting the sulfur monochlorid to repeated batch infusions of carbon bisulfid, alternating with distillation and removal of carbon bisulfid and carbon tetrachlorid.

6. In a process for making carbon tetrachlorid, the step of reducing sulfur monochlorid to sulfur which consists in subjecting the sulfur monochlorid to repeated batch infusions of carbon bisulfid, alternating with distillation and removal of carbon bisulfid and carbon tetrachlorid, the reduction being carried as far as possible at each infusion by reflux distillation before removal.

7. In a process for making carbon tetrachlorid, the step represented by the equation

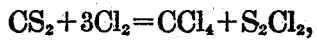

$$CS_2 + 3Cl_2 = CCl_4 + S_2Cl_2,$$

carried out by blowing gaseous chlorin into liquid carbon bisulfid, controlling the temperature by letting the mass boil, condensing the vapors, and returning them to the mass, and stopping as soon as the temperature of the mass ceases to rise.

8. In a process for making carbon tetrachlorid, the step of obtaining carbon tetrachlorid containing a small percentage of impurities and free from any catalyst by incompletely distilling carbon tetrachloride from a mixture containing carbon tetrachlorid, sulfur monochlorid, and a non-volatile catalyst.

9. In a process for making carbon tetrachlorid, the step of obtaining carbon tetrachlorid containing a small percentage of impurities by distilling a mixture containing carbon tetrachlorid and sulfur monochlorid only, and stopping the distillation before all the carbon tetrachlorid has been obtained.

10. In a process for making carbon tetrachlorid, the steps of making crude carbon tetrachlorid containing a small percentage of impurities by distilling a mixture composed substantially entirely of tetrachlorid and sulfur monochlorid, stopping the distillation before all the carbon tetrachlorid has been obtained, and passing the residual carbon tetrachlorid without chemical change thru a circuit in which the sulfur monochlorid is decomposed to form carbon bisulfid and more carbon tetrachlorid, and the carbon bisulfid is decomposed to form sulfur monochlorid and still more carbon tetrachlorid, and returning the same to the still.

11. In a process for making carbon tetrachlorid, the steps of decomposing a charge of carbon bisulfid, partly by reaction with sulfur monochlorid, and subsequently by reaction in a liquid bath with gaseous chlorin.

12. In a process for making carbon tetrachlorid, the steps of decomposing a charge of carbon bisulfid, partly by reaction with the sulfur monochlorid, and subsequently by reaction in a liquid bath with gaseous chlorin, the last reaction being carried to completion.

13. In a process for making carbon tetrachlorid, the elimination of sulfur monochlorid as an end product comprising the steps of carrying on the chlorination of carbon bisulfid in a liquid bath in two separate stages, the first stage employing sulfur monochlorid, and the second chlorin.

14. In a process for making carbon tetrachlorid, the elimination of sulfur monochlorid as an end product comprising the steps of carrying on the chlorination of carbon bisulfid in a liquid bath in two stages, the first stage employing sulfur monochlorid, and the second chlorin, an excess of carbon bisulfid being employed in the first stage to complete the reduction of sulfur monochlorid.

15. A process for making carbon tetrachlorid from chlorin and carbon disulfid, which comprises circulating material containing initially and essentially carbon bisulphide in a closed circuit, and carrying out the reaction in said circuit in a plurality of stages, chlorinating carbon and reducing sulfur in one stage, and chlorinating both carbon and sulfur in another stage.

16. A process for making carbon tetrachlorid from carbon and chlorin, which comprises, circulating sulfur in two closed circuits having a common point, one circuit including a separate re-action between sulfur and carbon to make carbon bisulfid, and a joint reaction between carbon bisulfid and sulfur monochlorid to form carbon tetrachlorid and sulfur, and the other circuit including said joint reaction, and a reaction between carbon bisulfid in a liquid bath and chlorin to form carbon tetrachlorid and sulfur monochlorid.

17. A process for making carbon tetrachlorid from carbon and chlorin which comprises, circulating sulfur in two closed circuits having two stages in common, one circuit including the stages of (a) forming carbon tetrachlorid and sulfur monochlorid from carbon bisulfid and chlorin, (b) separating carbon tetrachlorid from sulfur monochlorid by fractional distillation, (c) reducing sulfur monochlorid with carbon bisulfid, and (d) separating the other ingredients of stage (c) from sulfur by distillation to return them to stage (a), and the other circuit including stages (c) and (d) and (e) forming more carbon bisulfid from carbon and the sulfur from stage (d).

18. A process for making carbon tetrachlorid from carbon and chlorin which comprises, circulating sulfur in two closed circuits having two stages in common, one circuit including the stages of (a) forming carbon tetrachlorid and sulfur monochlorid from carbon bisulfid and chlorin, (b) separating carbon tetrachlorid from sulfur monochlorid by frictional distillation, (c) reducing sulfur monochlorid with carbon bisulfid, and (d)

separating the other ingredients of stage (c) from sulfur by distillation to return them to stage (a), and the other circuit including stages (b) and (c) and (e) forming more carbon bisulfid from carbon and the sulfur from stage (d), the carbon tetrachlorid not removed in stage (b) and that formed in stage (c) being returned without loss thru stage (d) to stage (a), and the compounds not removed from sulfur in stage (d) being returned without loss thru stage (e) to stage (c).

19. In a process for making carbon tetrachlorid, the elimination of sulfur monochlorid as an end product comprising the steps of carrying on the chlorination of carbon bisulfid in a liquid bath in two stages, the first stage employing sulfur monochlorid, and the second chlorin, an excess of carbon bisulfid being employed in the first stage to complete the reduction of sulfur monochlorid, the excess of carbon bisulfid making up the next charge for the process.

20. In a process for making carbon tetrachlorid, circulating a mass of material containing initially and essentially carbon bisulphide in a closed circuit involving two chemical reactions, first, chlorination, and second, reduction by carbon disulfid, withdrawing carbon tetrachlorid by distillation after the first and before the second reaction, and withdrawing sulfur as a residue after the second and before the first reaction.

21. In a process for making carbon tetrachlorid, circulating a mass of material containing intially and essentially carbon bisulphide in a closed circuit involving two chemical reactions, first, chlorination, and second, reduction by carbon disulfid, withdrawing carbon tetrachlorid by distillation after the first and before the second reaction, and withdrawing sulfur as a residue after the second and before the first reaction, an excess of carbon disulfid being employed during the second reaction to purify the sulfur before it is withdrawn.

22. A process for preparing a substantially pure carbon tetrachlorid which comprises chlorinating to completion a charge of carbon bisulfide without chlorination of the resulting sulfur chloride in the presence of a non-volatile catalyst, incompletely distilling to secure a substantially pure fraction of carbon tetrachlorid, and treating the resulting residue to convert sulphur chloride into carbon tetrachloride.

23. A process of making carbon tetrachlorid which comprises chlorinating a charge of carbon bisulfide in the presence of a non-volatile catalyst far enough to obtain a mixture of carbon tetrachlorid and sulfur monochlorid free from carbon bisulfid and sulfur dichlorid, subjecting the mixture to a fractional distillation, whereby to secure a residue containing sulphur chloride and carbon tetrachloride, and converting sulfur chloride in the residue into carbon tetrachloride.

In witness whereof, we hereunto subscribe our names this 26th day of June, 1922.

PAUL S. BRALLIER.
EDWARD J. DUNLAP.
GERALD D. MUGGLETON.